March 6, 1956 F. HERZEGH 2,737,237
APPARATUS FOR SLITTING TIRES TO A SELECTED DEPTH
Filed Oct. 25, 1952 2 Sheets-Sheet 2
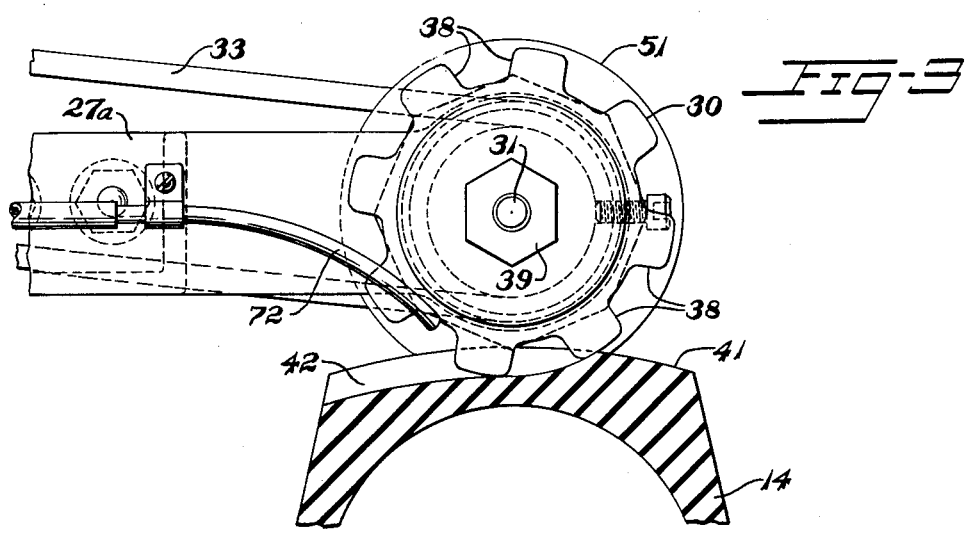
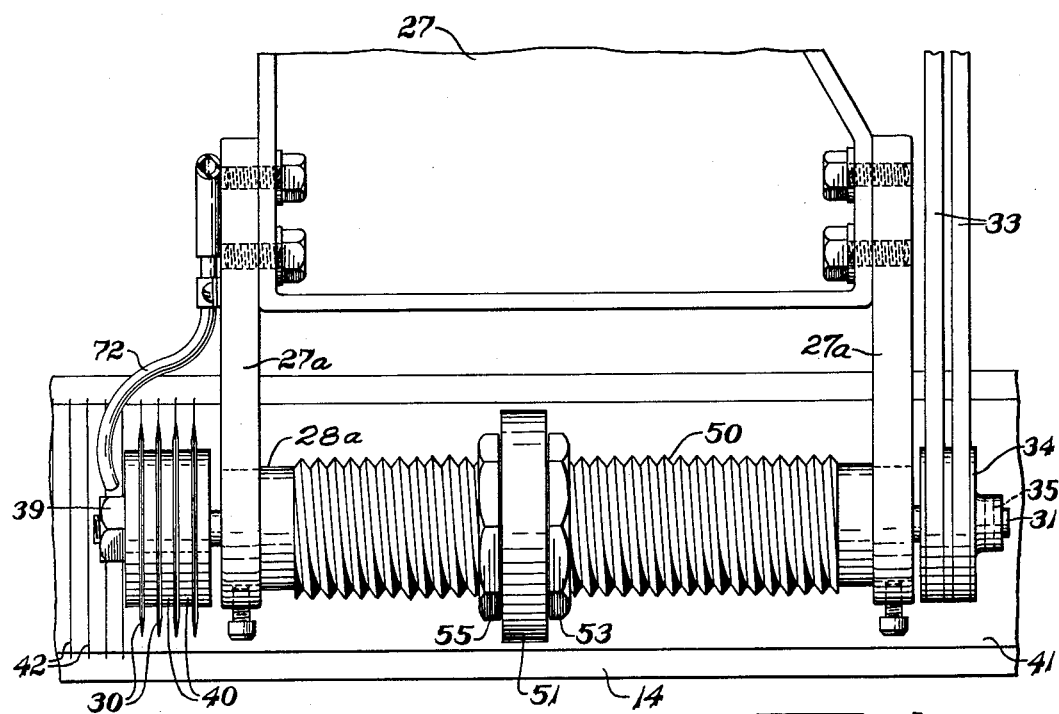

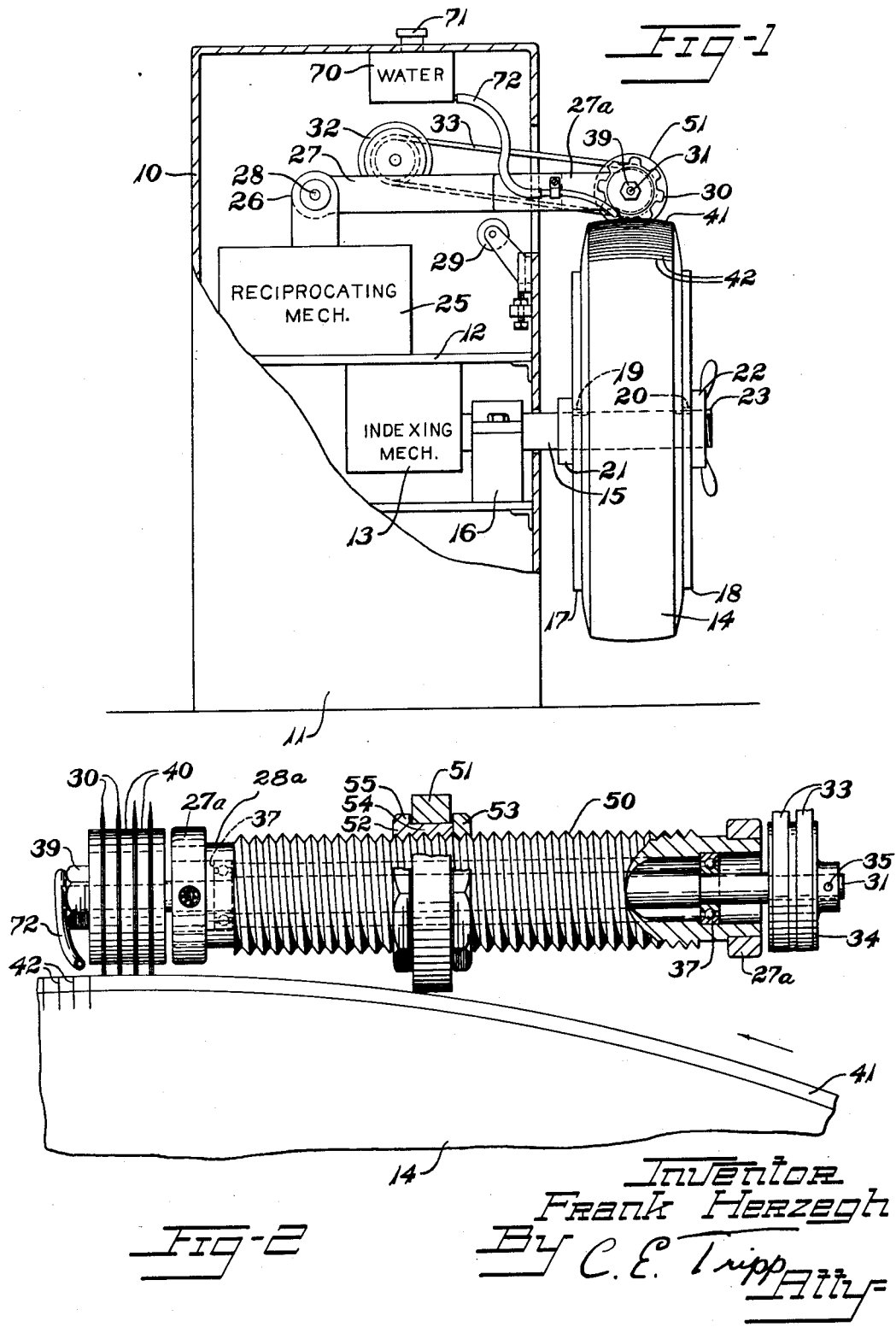

2,737,237
Patented Mar. 6, 1956

United States Patent Office

2,737,237

APPARATUS FOR SLITTING TIRES TO A SELECTED DEPTH

Frank Herzegh, Cleveland, Ohio, assignor to The B. F. Goodrich Company, New York, N. Y., a corporation of New York Application October 25, 1952, Serial No. 316,904

2 Claims. (Cl. 164—10.2)

This invention relates to slitting apparatus for slitting the rubber treads of vehicle tires and the like. Heretofore, it has been found that friction between the tire and road surface can be greatly increased by the provision of very narrow slots or slits extending crosswise in the material of the tread of the tire, as described in the co-pending application of Frank Herzegh, Serial Number 206,880, filed January 19, 1951, now Patent No. 2,716,435, assigned to The B. F. Goodrich Company.

The provision of narrow slits or slots across the surface of a tire tread during the molding of the rubber tread presents difficulties, especially where these slits are substantially knife cuts without appreciable width, and it has been found more satisfactory to vulcanize the tires without the slits and to provide the slits therein after vulcanization by a cutting operation.

I have found that two interrelated problems are presented, first that of maintaining a uniform depth of slit across the tread, and second providing for ready adjustment of slit depth to permit selection of the desired depth and maintenance of said depth as the cutters wear. Briefly this is accomplished by apparatus wherein a reciprocating cutter arm mounts an elongated transverse sleeve or bar member with a power driven cutter rotatable at one end of the member. Movable axially along the member (which is also disposed crosswise of the axis of a tire mounted on the apparatus) is a guide wheel that can be locked in place in selected axial position along the bar. With this arrangement, the axial spacing of the guide wheel and cutter determines the slit depth, and since the wheel and cutter are coaxially mounted, slit depth is uniform across the tread. A wide range of adjustment can be had by simply adjusting the guide wheel along its axis on the bar, there being no need to replace the wheel or cutter with members of different diameter.

The manner in which these advantages may be attained will be apparent from the following detailed description of a preferred embodiment thereof taken in connection with the accompanying drawings wherein:

Fig. 1 is a diagrammatic view of a slitting apparatus embodying the invention.

Fig. 2 is a front view of the portion of a slitting machine which includes the cutting blades and a portion of the tire being slit, and shows applicant's means for maintaining the depth of the slits.

Fig. 3 is an end view of the apparatus of Fig. 2 with parts broken away for clarity.

Fig. 4 is a plan view of the apparatus of Fig. 2 with parts broken away for clarity.

In Fig. 1 there is shown a frame 10, substantially enclosed with sheet metal covering 11, forming a rectangular box-shaped enclosure for containing that part of the apparatus less needful of accessibility. Within the covering 11 and supported by the frame 10 is a cross-member 12 from which is suspended an indexing mechanism 13 which brings about stepwise rotation of a tire 14 which is being slit. This rotation is in timed relationship with other operations involved in the slitting so that the tire rotates to a new cutting position during the interval between successive cutting operations, and is of a predetermined amount established and set into the mechanism by the operator prior to operation. This timed and measured rotation is transmitted to the tire 14 by a short, substantially heavy shaft 15 which is mounted on an anti-friction support bearing 16, this bearing being attached to and supported by frame 10. The shaft 15 has coaxially and removably mounted thereon two annular holding rings 17, 18 of greater diameter than the inside diameter of the tire 14 and located on each side of the tire. Holding rings 17, 18 are keyed to shaft 15 by keys 19, 20 transmitting positive motion from shaft 15 to holding rings 17, 18. One holding ring 17 rests against a flange 21 on shaft 15 and receives one side face of the tire which is to be treated; the other holding ring 18 is clamped against the other side face of the tire by threaded wing nut 22, screwed onto threaded end 23 of shaft 15, so that the tire is gripped between the rings 17 and 18 to receive the indexing, rotating motion of the holding rings.

Mounted on cross member 12 and attached thereto is a reciprocating mechanism shown as contained within a housing 25, and provided with an arm 26 protruding from the top thereof, pivotally mounting a cutter support arm 27 by means of a pivot 28. The reciprocating mechanism within the housing 25 forms no part of the invention and can be any conventional power driven device for moving the cutter arm 27 back and forth by an amount sufficient to provide for cutting clear across the tread of a tire from a non-functioning position on one side to a non-functioning position on the other. Arm 27, when the cutter is clear of the tire, is supported horizontally by an adjustable stop which may take the form of a roller 29, allowing freedom of the arm to reciprocate while so supported.

The cutter support arm 27 has two extension arms 27a between which extend an elongated sleevelike member 28a disposed crosswise of the axis of tire rotation and parallel to pivot 28. Rotary slitting blades 30 are mounted on a cutter shaft or mandrel 31 rotatably mounted in member 28a. The shaft 31 is driven by a power source such as a suitably located motor 32 and drive belts 33, 33 engaging a pulley 34 on the end of the shaft 31 opposite the slitting blades 30, 30, the pulley being retained on the end of shaft 31 by means of a pin 35. The cutter shaft 31 is mounted in member 28a by means of anti-friction bearings 37, 37, located internally at each end of member 28a.

Rotary slitting blades 30 are thin blades having a plurality of generally radial cutting edges 38. The blades are clamped on the shaft 31 by a lock nut 39 and are spaced apart by washers 40, 40. In Figs. 2 and 3, the slitting blades are shown slitting the tread 41 of the tire 14, several slits 42, 42 having been previously cut in the tire tread 41.

The outer surface of cutter shaft housing 28a is generally cylindrical in shape and coaxial with shaft 31, and is provided with screw threads 50 covering a major part of the available length of housing 36. The threads 50, form the support for the adjustable guide wheel 51.

As is shown in Fig. 2, the threads 50 have threaded on them a guide wheel journal 52 and lock nut 53. Journal 52 is comprised of two coaxially adjacent portions, a journal portion 54 for supporting the guide wheel 51 and a polygonal flange portion 55 for reception of a wrench. Concentrically and rotatably mounted on the journal portion 54 by a loose fit is the annular guide wheel 51. Axially adjacent to the journal portion 54 of journal 52 is the lock nut 53 similar and complementary to the polygonal flange portion 55 of journal 52. Journal portion 54 is substantially equal to guide wheel 51 in axial extent, actually being only enough greater in axial extent to provide axial clearance between the guide wheel 51 and the adjacent flange portion 55 and lock nut 53, allowing freedom of rotation for guide wheel 51 when lock nut 53 is tightly abutting journal 52.

The annular guide wheel 51, thus, rolls freely across the tire tread 41 during reciprocation of the arm 27 and slitting blades 30, 30, thus raising and lowering the cutter shaft housing 36 and the slitting blades 30, 30 in conformance with the shape of the tire tread 41 and causing the slitting blades 30, 30 to cut slits of equal depth across the entire width of the tread.

In order to reduce friction between the slitting blades 30, 30 and the tire tread 41 and thus improve the quality of the slits, a lubricant such as water is desirable at the cutting area. For this purpose a water supply is provided, such as a water tank 70, constructed with an inlet 71 for filling, suspended from the upper portion of the frame 10. A water hose 72 is attached to the water tank 70 and disposed so as to direct a stream of water from the tank toward the cutting portion of slitting blades 30, 30.

The operation of this tire slitting apparatus comprises three motions. A rotary motion is supplied to the slitting blades 30, 30 by the motor 32 through the drive belts 33, 33 pulley 34 and cutter shaft 31. Reciprocating motion is supplied to the slitting blades 30, 30 and guide wheel 51 by the reciprocating mechanism 25 through the arm 27. An indexing motion is supplied to the tire 14, by the indexing mechanism 13 through shaft 15, so that the blades 30, 30 operate on successive portions of the tread of the tire 14 until its entire circumference is treated. It is important that the guide wheel 51 be coaxial with the slitting blades 30, 30. Since the profile of the tread of the tire 14 has a pronounced curvature it has been found that a guide wheel which is not coaxial with the blades will not give an even depth of cut across the tire tread. The guide wheel and cutter axes are disposed normal to the reciprocation of the cutter assembly.

Referring again to Fig. 3, a slit 42 is shown of equal depth at all points, laterally across the tire tread 41. This equal depth is a result of this invention, a result of the use of coaxial guide wheel and slitting blade as discovered above.

A feature of this invention is the adjustment of the depth of slits 42 to permit selecting a depth and to compensate for the wear of the slitting blades over a period of use. Such depth adjustment can be made by loosening lock nut 53 with a wrench, and screwing the guide wheel journal 52 on the drive shaft housing screw threads 50, with the use of a wrench on the polygonal portion 55 of the guide wheel journal 52, thus increasing the distance between the slitting blades 30 and guide wheel 51 to deepen slits 42, 42, or decreasing the distance between slitting blades 30 and guide wheel 51 to decrease depth of slits 42, 42. For example, as the guide wheel 51 is moved away from the slitting blades 30, the guide wheel 51 will roll across a portion of tire tread that is relatively lower, and hence the axis of the cutter will drop causing the cutters to cut deeper into the tread.

Variations may be made without departing from the scope of this invention as it is defined by the following claims.

I claim:

1. Apparatus for cutting slits in the tread of a tire comprising a frame, means for mounting a tire on said frame for rotation about the tire axis, a cutter support on said frame movable radially toward and away from the axis of tire rotation, an elongated member carried by said cutter support and disposed crosswise of the axis of tire rotation, a rotary cutter rotatably mounted at one end of said elongated member, means for rotating said cutter, guide wheel means for engaging the periphery of the tire tread and limiting the depth of cut rotatably mounted upon and movable axially along said elongated member, adjustable means for locking said guide wheel means to said elongated member at a predetermined axial distance from the cutter, said cutter and guide wheel means remaining coaxial during adjustment of the latter along said elongated member, said cutter being urged toward the tire tread for cutting, means for causing relative motion of said tire mounting means and said elongated member in a direction perpendicular to the axis of cutter rotation and crosswise of the tread to slit the tire tread, and means for rotating said tire mounting means intermittently when the cutter is free of the tread to distribute the slits about the tread of the tire.

2. Apparatus for cutting slits in the tread of a tire comprising a frame, means for mounting a tire on said frame for rotation about the tire axis, a cutter support on said frame having spaced arms movable radially toward and away from the axis of tire rotation, an elongated sleeve member carried between said cutter support arms and disposed crosswise of the axis of tire rotation, a mandrel rotatably mounted on said sleeve, a rotary cutter mounted on said mandrel at one end of said elongated sleeve member, means for rotating said mandrel at the other end of said sleeve member, guide wheel means for engaging the periphery of the tire tread and limiting the depth of cut rotatably mounted upon the movable axially along said elongated sleeve member between said arms, adjustable means for locking said guide wheel means to said elongated sleeve member at a predetermined axial distance from the cutter, said cutter and guide wheel means remaining coaxial during adjustment of the latter along said elongated sleeve member, said cutter being urged toward the tire tread for cutting, means for causing relative motion of said tire mounting means and said sleeve member in a direction perpendicular to the axis of cutter rotation and crosswise of the tread to slit the tire tread, and means for rotating said tire mounting means intermittently when the cutter is free of the tread to distribute the slits about the tread of the tire.

References Cited in the file of this patent

UNITED STATES PATENTS

| | | |
|---|---|---|
| 91,512 | Briggs | June 22, 1869 |
| 325,812 | Bridgman | Sept. 8, 1885 |
| 1,238,312 | McArthur | Aug. 28, 1917 |
| 2,019,499 | Maher | Nov. 5, 1935 |
| 2,027,490 | Pendleton | Jan. 14, 1936 |
| 2,104,532 | Sommer | Jan. 4, 1938 |
| 2,109,691 | D'Ayguesvives | Mar. 1, 1939 |
| 2,158,167 | Wikle | May 16, 1939 |

FOREIGN PATENTS

| | | |
|---|---|---|
| 3,521 | Great Britain | Feb. 17, 1896 |
| 688,479 | Germany | Feb. 21, 1940 |